United States Patent
Hickman et al.

(10) Patent No.: US 8,948,498 B1
(45) Date of Patent: Feb. 3, 2015

(54) SYSTEMS AND METHODS TO TRANSFORM A COLORED POINT CLOUD TO A 3D TEXTURED MESH

(71) Applicant: Google Inc., Mountain View, CA (US)

(72) Inventors: Ryan Hickman, Mountain View, CA (US); James J. Kuffner, Jr., Mountain View, CA (US); James R. Bruce, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/974,129

(22) Filed: Aug. 23, 2013

Related U.S. Application Data

(60) Provisional application No. 61/715,135, filed on Oct. 17, 2012.

(51) Int. Cl.
*G06K 9/00* (2006.01)
*G06T 15/04* (2011.01)

(52) U.S. Cl.
CPC .................................... *G06T 15/04* (2013.01)
USPC ........................................................ 382/154

(58) Field of Classification Search
None
See application file for complete search history.

(56) References Cited

U.S. PATENT DOCUMENTS

| | | | |
|---|---|---|---|
| 7,098,435 B2 * | 8/2006 | Mueller et al. | 250/208.1 |
| 7,113,193 B2 * | 9/2006 | Marks | 345/589 |
| 7,542,033 B2 * | 6/2009 | Kawakami et al. | 345/419 |
| 8,655,055 B2 * | 2/2014 | Appia | 382/154 |
| 2012/0044476 A1 * | 2/2012 | Earhart et al. | 356/4.01 |

OTHER PUBLICATIONS

Autodesk 123D Catch. www.123dapp.com/catch._2013.

* cited by examiner

*Primary Examiner* — Daniel Mariam
(74) *Attorney, Agent, or Firm* — McDonnell Boehnen Hulbert & Berghoff LLP

(57) ABSTRACT

Examples disclose a method and system to transform a colored point cloud to a 3D textured mesh. The method may be executable to identify a location on a 2D image of an object, identify a location on a 3D image of the object, and determine a color associated with the location on the 2D image. Determining a color may include receiving data associated with a simulation of a plurality of rays cast on the 3D image, identifying a color of the location on the 3D image associated with the received data, identifying a confidence level associated with the identified color of the location on the 3D image, and associating the identified color of the location on the 3D image with the location on the 2D image.

20 Claims, 4 Drawing Sheets

SYSTEMS AND METHODS TO TRANSFORM A COLORED POINT CLOUD TO A 3D TEXTURED MESH

CROSS REFERENCE TO RELATED APPLICATION

The present application claims priority to U.S. Provisional patent application Ser. No. 61/715,135, filed on Oct. 17, 2012, and entitled "Systems and Methods to Transform a Colored Point Cloud to a 3D Textured Mesh," which is herein incorporated by reference as if fully set forth in this description.

BACKGROUND

In computer graphics, three-dimensional modeling (3D) involves generation of a representation of a 3D surface of an object. The representation may be referred to as a 3D object data model, and can be rendered or displayed as a two-dimensional image via 3D rendering or displayed as a three-dimensional image. 3D object data models represent a 3D object using a collection of points in 3D space, connected by various geometric entities such as triangles, lines, curved surfaces, etc. Various techniques exist for generating 3D object data models utilizing point clouds and geometric shapes, for examples.

Being a collection of data, 3D models can be created by hand, algorithmically, or objects can be scanned, for example. As an example, an artist may manually generate a 3D image of an object that can be used as the 3D model. As another example, an object may be scanned and the scanned image can be used to generate the 3D image of the object. As still another example, an image of an object may be used to generate a point cloud that can be algorithmically processed to generate the 3D image. A point cloud may include, for example, vertices in a three-dimensional coordinate system.

3D object data models may include solid models that define a volume of the object, or may include shell or boundary models that represent a surface (e.g., the boundary) of the object. Because an appearance of an object depends largely on an exterior of the object, boundary representations are common in computer graphics.

3D models are used in a wide variety of fields, and may be displayed using a number of different types of interfaces. Example interfaces may provide functionality to enable interaction between a user and the 3D models.

SUMMARY

The present application discloses, inter alia, systems and methods to transform a colored point cloud to a three-dimensional (3D) textured mesh. Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium.

In addition, circuitry may be provided that is wired to perform logical functions in any processes or methods described herein.

In still further examples, many types of devices may be used or configured to perform logical functions in any of the processes or methods described herein.

In yet further examples, many types of devices may be used or configured as means for performing functions of any of the methods described herein (or any portions of the methods described herein).

For example, a method may be executable to identify a location on a two-dimensional (2D) image of an object and identify a location on a three-dimensional (3D) image of the object. The location on the 3D image may correspond to the location on the 2D image. The method may be further executable to determine, by a processor, a color associated with the location on the 2D image by receiving data associated with a simulation of a plurality of rays cast on the 3D image. Each of the plurality of rays may be indicative of virtual light rays extending from a source to the location on the 3D image. Moreover, the method may be further executable to identify a color of the location on the 3D image associated with the received data. The identified color may be indicative of a color substantially at the location on the 3D image. In embodiments, the method may also be executable to identify a confidence level associated with the identified color of the location on the 3D image. In embodiments, the confidence level may be indicative of a likelihood that the identified color associated with the received data includes the color at the location on the 3D image of the object. The identified color of the location on the 3D image may be associated with the location on the 2D image.

In another example, a system may include at least one processor, a non-transitory computer-readable medium, and program instructions stored on the non-transitory computer-readable medium and executable by the at least one processor to cause the system to perform a number of functions. The functions may include identifying a location on a 2D image of an object and identifying a location on a 3D image of the object. The location on the 3D image may correspond to the location on the 2D image. The functions may also include determining a color associated with the location on the 2D image. The determination of a color to associate with the location on the 2D image may include receiving data associated with a simulation of a plurality of rays cast on the 3D image. In some examples, each of the plurality of rays may be indicative of virtual light rays extending from a source to the location on the 3D image. The determination may also include identifying a color of the location on the 3D image associated with the received data. The identified color may be indicative of a color substantially at the location on the 3D image. The determination may further include identifying a confidence level associated with the identified color of the location on the 3D image. The confidence level may be indicative of a likelihood that the identified color associated with the received data includes the color at the location on the 3D image of the object. Moreover, the determination may include associating the identified color of the location on the 3D image with the location on the 2D image.

In yet another example, a device may include a non-transitory computer-readable medium and program instructions stored on the non-transitory computer-readable medium and executable by at least one processor to perform a number of functions. The functions may include identifying a location on a 2D image of an object and identifying a location on a 3D image of the object. The location on the 3D image may correspond to the location on the 2D image. The functions may also include determining a color associated with the location on the 2D image by performing one or more additional functions. The functions may include receiving data associated with a simulation of a plurality of rays cast on the 3D image. Each of the plurality of rays may be indicative of virtual light rays extending from a source to the location on the 3D image. The functions may also include identifying a color of the location on the 3D image associated with the received data. The identified color may be indicative of a color substantially at the location on the 3D image. The functions may further include identifying a confidence level associated with the identified color of the location on the 3D image. The confidence level may be indicative of a likelihood that the identified color associated with the received data includes the color at the location on the 3D image of the object. Moreover, the functions may include associating the identified color of the location on the 3D image with the location on the 2D image.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
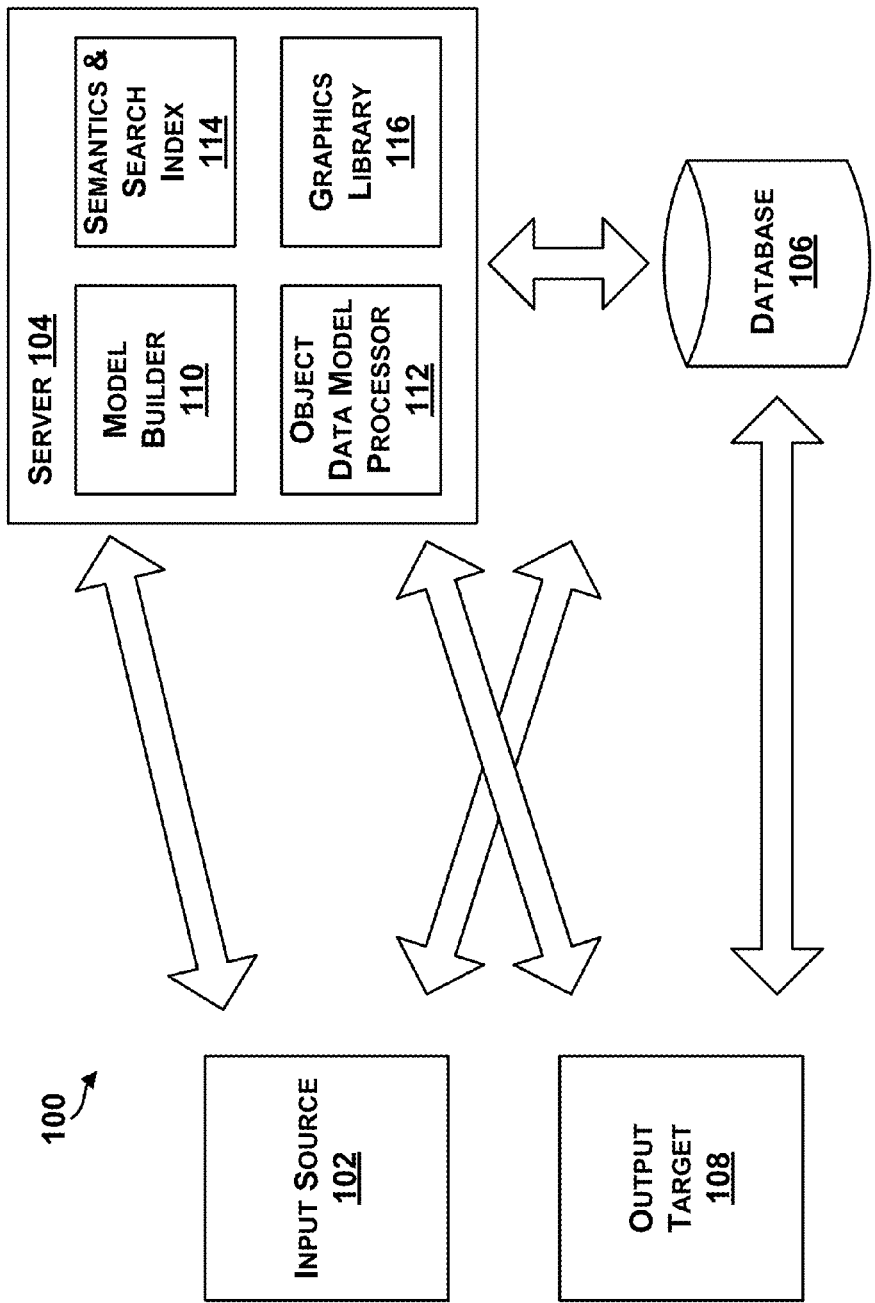
FIG. 1 illustrates an example system for object data modeling.

In some examples, methods and systems described herein include processes to transform a colored point cloud into a three-dimensional (3D) textured mesh. In particular, the systems and methods describe a collection of multiple images associated with a 3D object, and some or all of these images may be aligned and combined to create a high resolution 3D mesh that may be used to represent the 3D object. In some examples, combining the images associated with the 3D object to create the 3D mesh may cause color information associated with the 3D object to be lost. Methods and systems herein describe examples for using ray casting as a way to translate textures associated with the images of the 3D object for display.

In particular, the methods and systems described herein allow textures to be translated for a display. Textures can broadly include any number of colors, surface textures, or other details. The process of translating textures may include creating a high resolution 3D mesh model from the images of the 3D object, downsampling the 3D mesh model, unwrapping the 3D mesh model, ray casting over the images of the 3D object to identify texture information, and applying the identified texture to the high resolution 3D mesh, low resolution 3D mesh, unwrapped 3D mesh, etc. In some embodiments, ray casting may also or optionally be applied over the 3D mesh model.

As an example, images of a 3D object may be used to create a high resolution 3D mesh. However, not all of the data associated with the high resolution 3D mesh may need to be stored and/or displayed. In such embodiments, a low resolution 3D mesh of the 3D object may be created by decreasing the number of vertices, edges, and/or faces used to define the high resolution 3D mesh. The low resolution 3D mesh may be unwrapped to create a two-dimensional (2D) image. A server, or other system implementing the methods described herein, may identify a texture, such as a color, associated with all or part of the 3D mesh (or 2D unwrapped image) by casting simulated rays on one or more of the images of the 3D object. From each of the images, the server may receive one or more inputs (e.g., in the form of reflected, refracted, or absorbed rays), which the server may use to identify or determine a color at a location. In embodiments, the server may also receive inputs associated with nearby locations in one or more of the images of the 3D object, and use the inputs to aid in identifying the color at the location and/or nearby location, for example. When multiple inputs are received for a location, the inputs may be averaged or otherwise merged to determine a color to associate with the location. In embodiments, a confidence level may be associated with one or more of the inputs that may be used to weight one or more of the inputs prior to or subsequent to the merge. In this way, example methods and systems may account for lighting differentials between images, distances associated with the cast rays, angles at which the rays are cast, etc. In some examples, the merged data may be associated with a corresponding location on the high resolution 3D mesh, low resolution 3D mesh, and/or the unwrapped 3D image.

Referring now to the figures, FIG. 1 illustrates an example system 100 for object data modeling. The system 100 includes an input source 102 coupled to a server 104 and a database 106. The server 104 is also shown coupled to the database 106 and an output target 108. The system 100 may include more or fewer components, and each of the input source 102, the server 104, the database 106, and the output target 108 may comprise multiple elements as well, or each of the input source 102, the server 104, the database 106, and the output target 108 may be interconnected as well. Thus, one or more of the described functions of the system 100 may be divided up into additional functional or physical components, or combined into fewer functional or physical components. In some further examples, additional functional and/or physical components may be added to the examples illustrated by FIG. 1.

Components of the system 100 may be coupled to or configured to be capable of communicating via a network (not shown), such as a local area network (LAN), wide area network (WAN), wireless network (Wi-Fi), or Internet, for example. In addition, any of the components of the system 100 may be coupled to each other using wired or wireless communications. For example, communication links between the input source 102 and the server 104 may include wired connections, such as a serial or parallel bus, or wireless links, such as Bluetooth, IEEE 802.11 (IEEE 802.11 may refer to IEEE 802.11-2007, IEEE 802.11n-2009, or any other IEEE 802.11 revision), or other wireless based communication links.

The input source 102 may be any source from which a 3D object data model may be received. In some examples, 3D model acquisition (shape and appearance) may be achieved by working with venders or manufacturers to scan objects in 3D. The process of scanning the objects in 3D may include obtaining data from one or more scanners. Each scanner may have one or more heads, which may include geometry cameras, projectors, texture cameras, etc. In embodiments, the projector and geometry cameras may be used to capture a 3D shape mesh of a particular view, while the texture camera may be used to capture a color photo from a nearby position.

For instance, structured light scanners may capture images of an object and a shape of the object may be recovered using monochrome stereo cameras and a pattern projector. In other examples, a high-resolution DSLR camera may be used to capture images for color texture information. In still other examples, a raw computer-aided drafting (CAD) set of drawings may be received for each object. Thus, the input source 102 may provide a 3D object data model, in various forms, to the server 104. As one example, multiple scans of an object may be processed into a merged mesh and assets data model, and provided to the server 104 in that form.

The server 104 may include a model builder 110, an object data model processor 112, a semantics and search index 114, and a graphics library 116. Any of the components of the server 104 may be coupled to each other. In addition, any components of the server 104 may alternatively be a separate component coupled to the server 104. The server 104 may further include a processor and memory including instructions executable by the processor to perform functions of the components of the server 104, for example.

The model builder 110 may receive the mesh data set for each object from the input source 102, which may include a data set defining a dense surface mesh geometry, and may generate an animated model of the object in 3D. For example, the model builder 110 may perform coherent texture unwrapping from the mesh surface, and determine textures of surfaces emulated from the geometry.

The object data model processor 112 may also receive the mesh data set for each object from the input source 102 and generate display meshes. For instance, the scanned mesh images may be decimated (e.g., from 5 million to 120,000 surfaces) utilizing texture-preserving decimation. Texture map generation can also be performed to determine color texture for map rendering. Texture map generation may include using the mesh data sets that have colors but no ultraviolet unwrapping to generate a mesh with UV unwrapping but no colors.

The semantics and search index 114 may receive captured images or processed images that may have been decimated and/or compressed, and may perform texture resampling and also shape-based indexing on the processed images. For example, for each object, the semantics and search index 114 may index or label components of the images (e.g., per pixel) as having a certain texture, color, shape, geometry, attribute, etc.

The graphics library 116 may include a WebGL or OpenGL mesh compression to reduce a mesh file size, for example. The graphics library 116 may provide the 3D object data model in a form for display on a browser, for example. In some examples, a 3D object data model viewer may be used to display images of the 3D objects data model. The 3D object data model viewer may be implemented using WebGL within a web browser, or OpenGL, for example.

In addition to the above noted components of the server, the server 104 may also include additional components. For example, the server 104 may include a simulator, which may be configured to simulate one or more rays of light for use in a ray casting and/or ray tracing algorithm. In some embodiments, the simulator may be further configured to communicate with the processor to apply a ray casting algorithm or procedure. In particular, the simulator may generate or otherwise simulate a ray of light. The ray of light may originate or be cast from a simulated hypothetical view point of a user or party viewing the 3D object, for example. The simulator may cause the ray to be cast toward and intersect an image of a 3D object, a simulation of a 3D object, or other representation of the 3D object. Upon intersection, the ray may obtain information associated with a location at the image of the 3D object, the simulation of the 3D object, or other representation of the object in a number of ways, including reflection, refraction, or absorption of the ray. In embodiments, the information may include or be indicative of a color at the intersecting location or a location near or substantially near the intersecting location. The simulator may receive the information and use the information to identify a color at the intersecting location and associate the identified color with a 2D image of the object, a 3D image of the object, a 3D mesh model of the object, etc.

The database 106 may store all data sets for a 3D object data model in any number of various forms from raw data captured to processed data for display.

The output target 108 may include a number of different targets, such as a webpage on the Internet, a search engine, a database, etc. The output target 108 may include a 3D object data model viewer that enables product advertisements or product searches based on the 3D object data model.

In examples herein, the system 100 may be used to acquire data of an object, process the data to generate a 3D object data model, and render the 3D object data model for display.

In some examples, annotations may be provided for aspects of the 3D object data model. For instance, an annotation may be provided to label or index aspects of color, texture, shape, appearance, description, function, etc., of an aspect of a 3D object data model. Annotations may be used to label any aspect of an image or 3D object data model, or to provide any type of information. Annotations may be performed manually or automatically. In examples herein, an annotated template of an object in a given classification or category may be generated that includes annotations, and the template may be applied to all objects in the given classification or category to apply the annotations to all objects.

Figure 2:
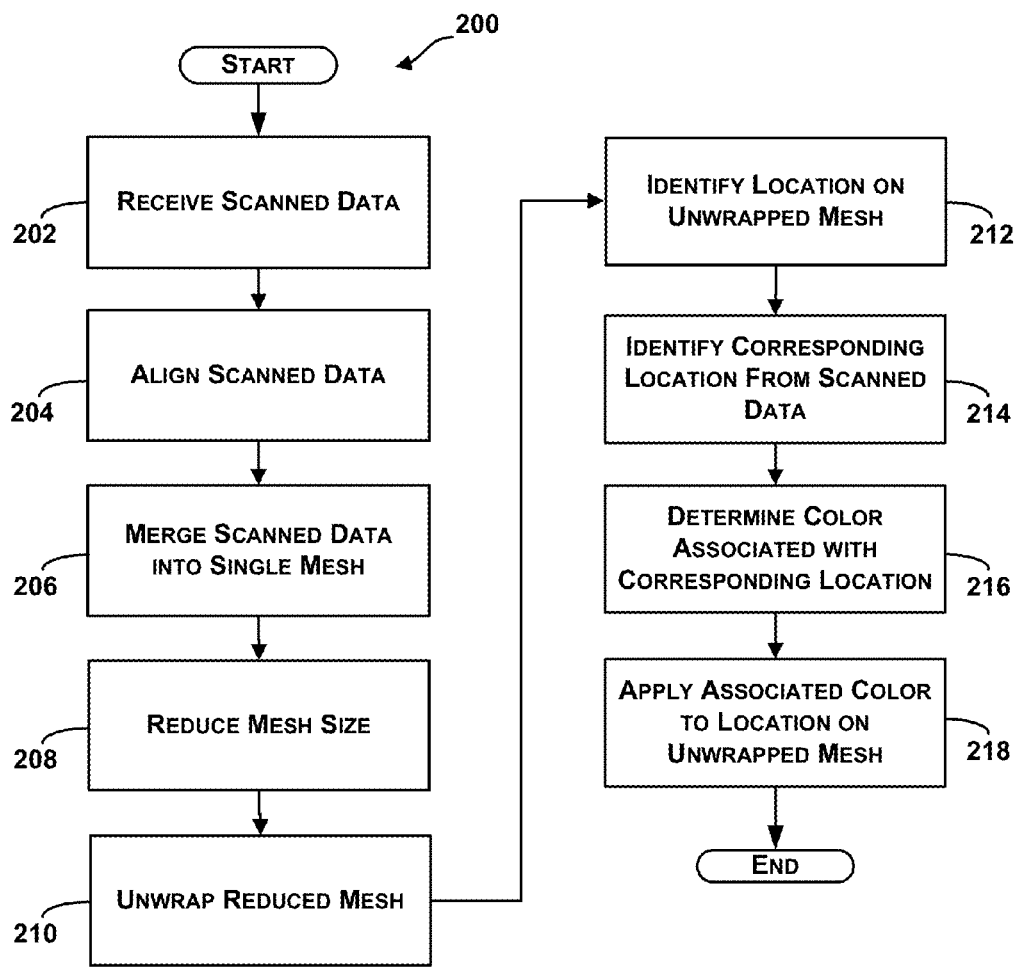
FIG. 2 illustrates a block diagram of an example method for identifying a color associated with a location on a mesh.

FIG. 2 illustrates a block diagram of an example method for identifying a color associated with a location on a mesh, in accordance with at some of the embodiments described herein. Method 200 shown in FIG. 2 presents an embodiment of a method that could be used with the system 100, and may be performed by a device or components of the device. An example device may include the server illustrated in FIG. 1 or any number of other devices associated with the system. Method 200 may include one or more operations, functions, or actions as illustrated by one or more of blocks 202-218. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the flowchart shows functionality and operation of one possible implementation of the present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage system. The computer readable medium may, for example, be considered a computer readable storage medium or a tangible storage device.

In addition, for the method 200 and other processes and methods disclosed herein, each block in FIG. 2 may represent circuitry that may be wired to perform the specific logical functions in the process.

At block 202, the method 200 includes receive scanned data. The scanned data may be received by a device, such as a server, and may be representative of any number of objects. In embodiments, the scanned data may be obtained via one or more scanners having one or more heads. The one or more heads may include geometry cameras, projectors, texture cameras, etc. One or more of the scan heads may be positioned around the object so as to obtain data from a variety of directions. Thus, for example, an object may be placed on a transparent moving turntable, and scan heads may be positioned above, below, and in front of the object. The scan heads may obtain information about the object as the object rotates using the turntable. Each instance at which data is obtained may be associated with a view. Each one of the views may be associated with a color photo, a geometric mesh, and/or a textured mesh, for example.

At block 204, the method 200 may include align scanned data. The scanned data may be aligned by the server, for example. As an example, the scanning process may involve scanning an object from multiple different views using a plurality of devices on one or more of the scan heads. This process may result in a plurality of views from different angles, with different lighting, from different distances, etc. The plurality of views may be processed and aligned using any number of algorithms, such as an iterative closes point (ICP) algorithm. In embodiments, the geometry from the different views may be brought into close agreement by initializing the views based on the known scan head positions, the turntable angle, etc. In some examples, scanned data may be aligned by an alignment server and received at another server for further processing.

At block 206, the method 200 may include merge scanned data into single mesh. This process may be performed by a server, and may include the server merging or otherwise combining one or more of the aligned views together. In embodiments, the process of merging the scanned data into a single mesh may be performed in whole or in part by the model builder 110, for example, and include identifying the same or similar location on one or more of the scanned images of the 3D object, identifying an average or representative location corresponding to the location on the one or more scanned images of the 3D object, and creating an exemplary merged model based on the representative locations. The result of the merger may be a mesh that may include a collection of finite elements that may be used to model or otherwise define the shape of the scanned object. In some examples, the elements that may be used to create the mesh may include a collection of vertices, edges, faces, etc.

In embodiments, the vertices, edges, faces, etc. included in the mesh may be used to create a plurality of triangles or other geometric shapes. The number and types of geometric shapes that may be used during the merge may vary based on the amount of detail associated with one or more of the views, the size of the object, the number of scan heads, the type of scanner and/or camera used to obtain the scan data, etc. Thus, for example, a first object may be represented with millions of triangles, while a second object may be represented with hundreds of thousands of quadrilaterals or other convex and/ or concave polygons. In some examples, a variety of different types of polygons may be used to define the object such that triangles may be used to define a first portion of the object and quadrilaterals may be used to define a second portion of the object, for example.

During the process of merging the scanned data, color information may be lost. Accordingly, the merging process may result in a single mesh representative of the scanned object; however, the single mesh may be void of color or include less amount of information associated with any location on the object or on any of the images of the object.

At block 208, the method 200 may include reduce mesh size. This process may be performed by the server, such as by the object data model processor 112. In embodiments, the process may include the server iteratively merging nearby vertices while trying to maintain the overall shape of the model represented by the mesh. This iterative merging may be performed by identifying nearby vertices, determining whether two or more vertices have the same or substantially similar normal, and if so, merging the two or more vertices into a single vertex. In some embodiments, the merging process may additionally or optionally be performed using any number of known algorithms, such as an ICP algorithm, that allows the number of polygons that make up the mesh to be reduced while preserving the shape of the mesh. By performing this process, a smaller model, with larger polygons, may be created. The smaller model may approximate the higher resolution of the merged model. Thus, for example, the smaller model may include tens of thousands of polygons, which may be representative of the merged higher resolution model having millions of polygons. The amount or degree that an object may be reduced or otherwise decimated may vary between embodiments. It should be understood that as the mesh size is reduced, data associated with one or more points on the mesh may be condensed or lost.

At block 210, the method may include unwrap reduced mesh. This process may be performed by the server. The process of unwrapping the mesh may include associating every point on the 3D mesh to a point on a 2D plane such that $f(x,y,z) \rightarrow (u,v)$ where $(x,y,z)$ is a surface point on the mesh and $(u,v)$ is a position on the image. A point on the 3D mesh may be associated with a point on the 2D plane using any number of methods known to those of skill in the art. As an example, a method may be used that convert points on a 3D coordinate system to a 2D coordinate system. Similarly, any number of projection techniques may be used that allow a 3D point to correspond to a 2D point. In embodiments, this process may be performed using one or more projections that may preserve any of the mesh's (i) geometry, (ii) area, (iii) angles, (iv) distances, (v) direction, (vi) etc.

As an example, multiple scan heads may be used to scan an object, such as an orange. The server may receive the scanned data, create a mesh representing the scanned orange, and unwrap the mesh. The unwrapping may result in the surface of the scanned orange being represented on a 2D plane. However, since the orange peel was in a 3D space, the conversion of the orange peel into a 2D space by unwrapping and flattening the orange peel may result in a number of voids that may not be associated with a point on the 3D mesh. Accordingly, the unwrapping process may not be symmetric.

Once the mesh is unwrapped, a color may be associated with one or more locations on the 2D plane. However, since all or part of the color data may have been lost when merging the scanned data to create a single mesh, a separate process may be used to identify a color to associate with one or more locations on the 2D plane.

At block 212, the method 200 may include identify location on unwrapped mesh. This process may be performed by the server and may broadly include the selection of any location, area, point, or portion of the unwrapped mesh as it may be represented on the 2D plane. In embodiments, the server may additionally or alternatively identify a location on the high resolution 3D model and/or the low resolution 3D model.

At block 214, the method 200 may include identify corresponding location from scanned data. This process may be performed by the server and may include identifying color data associated with all or part of the data obtained from the scan head devices prior to the scanned data views being merged to create a mesh. In embodiments, each location on the 2D plane may correspond to a location on the 3D scanned data. In some embodiments, however, there may be voids on the 2D plane that may result from unwrapping the mesh. In such instances, each point on the 3D model may corresponds to a point on the 2D plane, but not every point on the 2D plane may be associated with the 3D scanned data (as discussed elsewhere herein). Thus, in embodiments, voids on the 2D plane may not have a corresponding point on the 3D model and, therefore, may not be associated with a color corresponding to the scanned data.

At block 216, the method 200 may include determine color associated with corresponding location from scanned data. This process may be performed in whole or in part by the server. In embodiments, the process of determining a color associated with the corresponding location on the scanned data may include one or more ray casting techniques that may be performed by a simulator at the server, for example. Ray casting may generally include sending one or more simulated rays from a source to a simulated object through a viewing plane and receiving color data associated with the location at the simulated object at which the simulated ray intersects. The ray casting may result in received data associated with a color and/or a location on one or more of the images.

In embodiments, the server may determine a confidence level associated with data received as a result of the ray casting. The confidence level may represent likelihood that the identified color may be the correct or actual color at the object. The confidence level may be based on any number of factors including (i) how much object surface area was available during the scan, (ii) the distance the scan head was away from the object, (iii) the distance the cast ray is from the object or the scanned object, (iv) the amount of light available during the scan, (v) etc.

As an example, the confidence level may be associated with how much surface area was available during the scan. If a large surface area was available during the scan, it may be assumed that a relatively large amount of data about the object was received, that the data is more accurate, that there is surrounding data that may be available and/or used to identify the color, etc. Conversely, if a small surface area was available, it may be assumed that a correspondingly smaller amount of data, smaller number of surrounding locations, etc. were obtained during the scan. Thus, when scanning a book, for example, a scan of the cover of the book may result in more data than a scan of the rim of the book. The server may associate color data with both the cover and the rim of the book; however, the server may associate a higher confidence level with the colors identified on the cover of the book as the scanning device may have had a better view of the cover and was able to obtain relatively more information about the cover. Typically, the more data that was obtained during the scan, the more color data that may be obtained during ray casting.

In some embodiments, the amount of surface area obtained during the scan may be related to the angle of the scan head device to the object during the scan. Thus, for example, a scan of the object may provide relatively more data about the object when taken at an angle orthogonal to the surface of the object rather than at an acute or an obtuse angle (such as a 180 degree angle) to the surface of the object or at a parallel plane to the surface of the object, for example. In embodiments, the higher the amount of surface area available during the scan, the higher the confidence level that the color associated with the scanned surface area is an accurate representation of the color of the object.

The confidence level may also or optionally be based on the distance the scan head, or the device on the scan head, was away from the object when the scan data was obtained. Generally, the closer the scan head and/or device are to the object during the scan, the higher the confidence level associated with the scan. Similarly, the farther the scan head and/or device was to the object during the scan, the lower the confidence level associated with the scan. In embodiments, the distance may be in part or in whole affected by an amount of noise associated with the scan, such that the confidence level may decrease as the amount of noise associated with the scan increases.

In yet another embodiment, the confidence level may be based on the length of the cast ray. In particular, the ray may be represented in some embodiments as a beam or a wave of simulated light. The ray may extend from a simulated view point of a user to the image of the 3D object. The simulated view point may be representative of an angle at which the 3D object or the 3D mesh is being view or is likely to be viewed. For example, the simulated view point may be indicative of an angle at which one or more rays are cast on a 3D object. In embodiments, the distance the simulated ray travels may depend in part or in whole on the distance the scan head and/or device was to the object during the scan. Thus, for example, a plurality of simulated rays may be cast on the 3D image. One of the rays may have a first length and a second one of the rays may have a second length that is greater than the first length. In some embodiments, a confidence level may be associated with each ray such that a higher confidence level is associated with the ray having the shortest length. This may be because a shorter length may indicate that the ray has less distance to travel, and therefore, may be less prone to error. Moreover, a shorter length may indicate that the distance from the source to the object is short and that the accuracy of the data obtained about an object that is close to the source may be more detailed and/or accurate than data obtained about an object relatively further from the source, for example.

Additional factors may also affect the confidence level. For example, the amount of lighting available during the scan may affect an amount of data that was obtained and the accuracy of the obtained data. Thus, a lower confidence level may be associated with scanned data when there was little to no light available during the scan. In some embodiments, the confidence level may also be lower when there was too much light available during the scan such that the scanned data was over exposed in whole or in part.

The confidence level may include one or any combination of the above noted factors. In embodiments, different confidence levels or ranges may be associated with one or more of the factors. Moreover, in some embodiments, the confidence level may be compared to a threshold and a determination may be made as to whether the confidence level exceeds the threshold. Some embodiments may require that the confidence level of one or more of the inputs exceed the threshold prior to applying the color associated with the confidence level to the 2D unwrapped mesh or to the 3D mesh(s).

It should be understood that a confidence level may be assigned with a single ray and/or a combination of rays. Thus, for example, multiple rays may be cast at the same location on different images of the 3D image so as to obtain color data associated with multiple views. The confidence level associated with each of the cast rays may differ based on one or more of the above noted factors. The color data associated with each of the cast rays may be combined with the confidence level to obtain a weighted average associated with each of the multiple rays. The weighted average may be used when determining what color should be associated with the corresponding location on the 2D unwrapped mesh or the 3D mesh(s). In yet further examples, an average color associated with the location may be determined and a confidence level of the average color may then be determined for the average color. In such examples, the confidence level may be determined based on factors associated with one or more of the rays, a subset of the rays, those rays falling within a certain standard deviation of one another, etc.

In embodiments, the color determined at block 216 may be a weighted average of the confidence level associated with one or more rays and the identified color associated with the respective one or more rays.

At block 218, the method 200 may include apply associated color to location on unwrapped mesh. The server may perform this process by, inter alia, associating color data for each location on the 2D plane. The color data may be transient or stored in a database. In embodiments, the color data may be updated periodically such as when additional scanned data associated with an object is received, for example. Moreover, in embodiments, the color may be associated with a location on high resolution 3D mesh and/or the low resolution 3D mesh. This may be performed directly by applying the color to the 3D mesh without first applying the color to the 2D plan. Optionally, this may be performed by applying the color to the 2D plan and associating the color to the equivalent location on the 3D mesh, for example.

Figure 3:
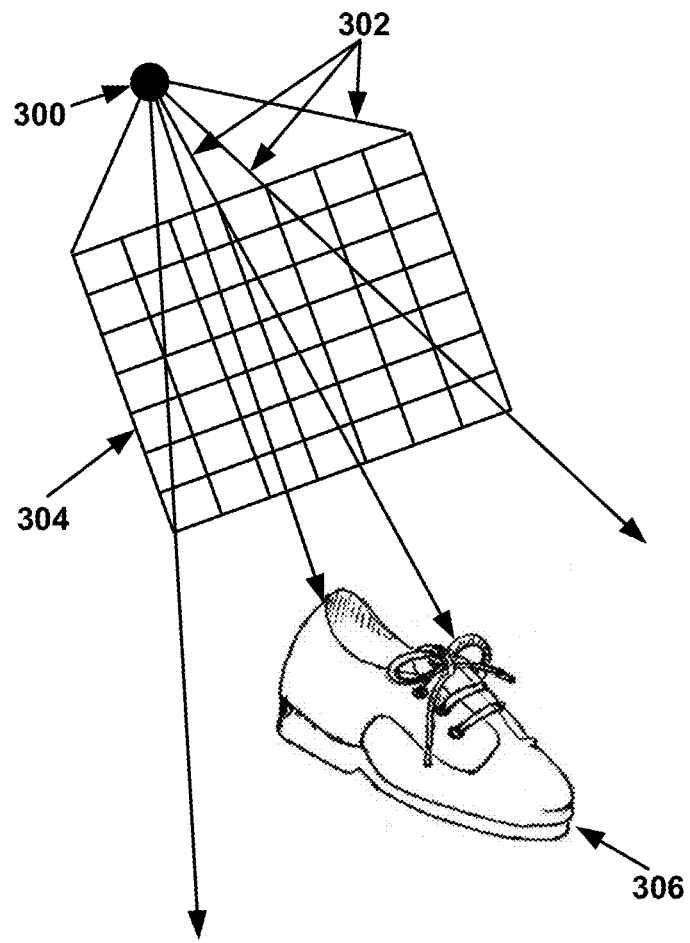
FIG. 3 illustrates an example of casting a ray from a source to an image of an object.

FIG. 3 illustrates an example of ray casting, in accordance with at some of the embodiments described herein. In particular, FIG. 3 includes an eye position 300, one or more rays 302, a view plane 304, and an object 306. In the context described herein, ray casting may generally include one or more simulated rays 302 being cast from the eye position 300 or source through a viewing plane 304, one pixel at a time. The one or more rays 302 may continue to be cast until one or more of the rays 302 intersect the object 306. The object 306 may be a simulated object and/or may be based on image data of the 3D object received by the server, for example. Once one or more rays 302 intersect the object 306, the one or more rays 302 may be reflected, refracted, or absorbed by the object 306 and data may be obtained and used to identify or otherwise compute information associated with one or more volumetric pixels (voxels) at the intersection. Information identified or otherwise computed from the one or more rays 302 may include a color associated with the voxel, a surface light associated with the voxel, etc. The server (or another device) may use the identified and/or computed information to identify a color associated with a location associated with the intersection on the 3D scanned data. In embodiments, the color may be identified by one or more of (i) a red-green-blue code, (ii) a decimal code, (iii) a hexadecimal code, (iv) etc.

Figure 4:
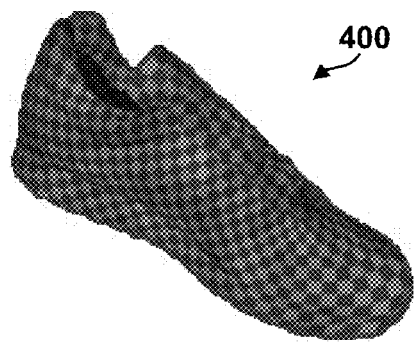
FIG. 4 illustrates an example 3D model.

FIG. 4 illustrates an example 3D model, in accordance with at least some of the embodiments described herein. In particular, FIG. 4 illustrates a 3D model mesh 400 created from multiple images of a 3D object that were scanned and aligned to create the 3D model mesh 400. The illustrated 3D model mesh 400 includes a number of quadrilaterals that define the parameters of the object.

Figure 5:
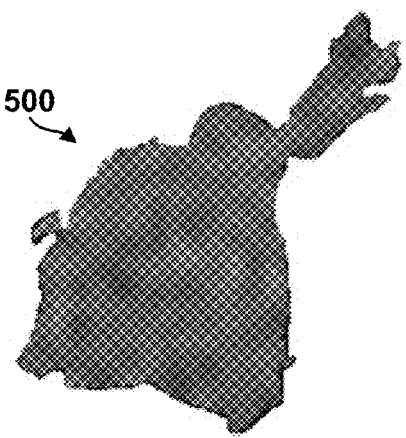
FIG. 5 illustrates an example texture image.

FIG. 5 illustrates an example texture image, in accordance with at least some of the embodiments described herein. In particular, FIG. 5 illustrates an unwrapped 2D mesh 500, which may be associated with the 3D model mesh 400. In embodiments, the 2D mesh 500 may represent a 2D image of the object, for example. Each location on the 3D model mesh 400 may correspond to a location on the 2D mesh 500. Moreover, one or more textures associated with the 3D model mesh 400 may correspond to the 2D mesh 500. Thus, for example, a texture surface or shading associated with the 3D model mesh 400 may also correspond to the 2D mesh 500. Likewise, each location on the image of the 3D object may correspond to a location on the 2D image of the object.

Figure 6:
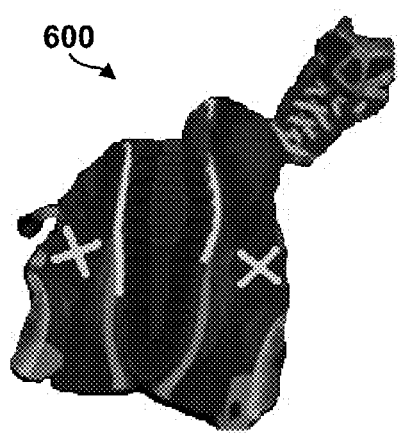
FIG. 6 illustrates an example texture image after a texture transfer.

FIG. 6 illustrates an example texture image after a texture transfer, in accordance with at least some of the embodiments described herein. In particular, FIG. 6 illustrates a textured 2D mesh 600. The textured mesh 600 may include one or more textures, such as a surface texture, a color, etc. In embodiments, one or more of the textures may be identified based on the 3D model mesh 400 and/or based on images of the 3D object that may have been used to create the 3D model mesh 400.

As an example, the textured 2D mesh 600 may include texture in the form of color. The color may be obtained, for example, by identifying a location on the 2D mesh 600. A corresponding location may also be identified on one or more of the 3D images of the object. A server or other processing device may determine the color associated with the location on the 2D image of the object by, inter alia, casting simulated rays at the 3D image(s) of the object and receiving data associated with the cast rays. For each ray, the server may identify a color associated with the ray along with a confidence level indicating the likelihood that the identified color is representative of the color at the 3D image of the object, for example. In some examples, the server may identify the color based on the combination of a plurality of rays such that a first ray may be associated with the location on a first 3D image of the object and a second ray may be associated with the same relative location on a second 3D image of the object. Data associated with the first ray and the second ray (as well as any other corresponding rays) may be combined to identify the color at the location. Thus, for example, the colors associated with the rays may be weighted, averaged, etc. to identify the color at the location. Once a color is identified, the identified color may be associated with the corresponding location on the 2D image of the object (e.g., the corresponding portion on the 2D mesh) so as to create the textured 2D mesh 600, for example.

In embodiments, the textured 2D mesh 600 may be wrapped on a 3D mesh, such as 3D model mesh 400. This process may include transferring texture data associated with a location on the textured 2D mesh 600 to a corresponding location on the 3D model mesh 400, for example. Thus, textures (such as color) that may have been lost during the creation of the 3D model mesh 400 may be identified and applied to not only create the textured 2D mesh 600, but also the corresponding 3D model mesh 400.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense.

What is claimed is:

1. A method comprising:
    identifying a location on a two-dimensional (2D) image of an object;
    identifying a location on a three-dimensional (3D) image of the object, wherein the location on the 3D image corresponds to the location on the 2D image;
    determining, by a processor, a color associated with the location on the 2D image by:
        receiving data associated with a simulation of a plurality of rays cast on the 3D image, wherein each of the plurality of rays are indicative of virtual light rays extending from a source to the location on the 3D image;
        identifying a color of the location on the 3D image associated with the received data, wherein the identified color is indicative of a color substantially at the location on the 3D image;
        identifying a confidence level associated with the identified color of the location on the 3D image, wherein the confidence level is indicative of a likelihood that the identified color associated with the received data includes the color at the location on the 3D image of the object; and
        based on the confidence level, associating the identified color of the location on the 3D image with the location on the 2D image.

2. The method of claim 1, wherein the location on the 2D image of the object is substantially equivalent to the location on the 3D image of the object.

3. The method of claim 1, wherein the identified color is an average of the identified color associated with the received data associated with each of the plurality of rays cast on the 3D image.

4. The method of claim 1, wherein the plurality of rays cast on the 3D image include a first ray, and the method further comprises:
    receiving data associated with a simulation of the first ray;
    based on the received data, identifying a color associated with the first ray, wherein the identified color associated with the first ray includes a weighted average of a confidence level associated with the first ray and the identified color associated with the first ray.

5. The method of claim 1, wherein identifying a color associated with the received data includes identifying at least one of (i) a red-green-blue code, (ii) a decimal code, and (iii) a hexadecimal code.

6. The method of claim 1, wherein the confidence level is further associated with a length of a ray of the plurality of rays cast on the 3D image.

7. The method of claim 6, wherein the plurality of rays cast on the 3D image include a first ray having a first length and a second ray having a second length that is greater than the first length, and the method further comprises:
    identifying a confidence level associated with the first ray; and
    identifying a confidence level associated with the second ray, wherein the confidence level associated with the first ray is greater than the confidence level associated with the second ray.

8. The method of claim 1, wherein the plurality of rays cast on the 3D image include a first ray cast at an orthogonal angle to the 3D image and a second ray cast at one of an obtuse or an acute angle to the 3D image, and the method further comprises:
    identifying a confidence level associated with the first ray; and
    identifying a confidence level associated with the second ray, wherein the confidence level associated with the first ray is greater than the confidence level associated with the second ray.

9. The method of claim 1, wherein the associating the identified color of the location on the 3D image with the location on the 2D image further comprises:
    comparing the confidence level to a threshold; and
    associating the identified color of the location on the 3D image with the location on the 2D image responsive to the confidence level being greater than the threshold.

10. The method of claim 1, wherein the plurality of rays cast on the 3D image are one of (i) reflected, (ii) refracted, and (iii) absorbed by the 3D image.

11. The method of claim 1, wherein the source is a simulated view point indicative of an angle at which the plurality of rays are cast on the 3D image.

12. A system comprising:
    at least one processor;
    a non-transitory computer-readable medium; and
    program instructions stored on the non-transitory computer-readable medium and executable by the at least one processor to cause the system to:
        identify a location on a two-dimensional (2D) image of an object;
        identify a location on a three-dimensional (3D) image of the object, wherein the location on the 3D image corresponds to the location on the 2D image;
        determine a color associated with the location on the 2D image by:
            receiving data associated with a simulation of a plurality of rays cast on the 3D image, wherein each of the plurality of rays are indicative of virtual light rays extending from a source to the location on the 3D image;
            identifying a color of the location on the 3D image associated with the received data, wherein the identified color is indicative of a color substantially at the location on the 3D image;

identifying a confidence level associated with the identified color of the location on the 3D image, wherein the confidence level is indicative of a likelihood that the identified color associated with the received data includes the color at the location on the 3D image of the object; and associating the identified color of the location on the 3D image with the location on the 2D image based on the confidence level.

13. The system of claim 12, wherein the 3D image includes a mesh generated from a plurality of images of the object.

14. The system of claim 13, wherein the confidence level is further associated with an amount of light associated with the plurality of images of the object.

15. The system of claim 12, wherein the confidence level is further associated with an amount of surface area on the 3D image.

16. The system of claim 12, wherein the confidence level is further associated with a length of each of the plurality of rays cast on the 3D image.

17. The system of claim 12, wherein the 3D image of the object includes a plurality of locations, wherein each of the plurality of locations is associated with a respective location on the 2D image of the object.

18. A non-transitory computer-readable medium having stored thereon instructions executable by a computing device having at least one processor to cause the computing device to perform functions comprising:

identifying a location on a two-dimensional (2D) image of an object;

identifying a location on a three-dimensional (3D) image of the object, wherein the location on the 3D image corresponds to the location on the 2D image;

determining a color associated with the location on the 2D image by:

receiving data associated with a simulation of a plurality of rays cast on the 3D image, wherein each of the plurality of rays are indicative of virtual light rays extending from a source to the location on the 3D image;

identifying a color of the location on the 3D image associated with the received data, wherein the identified color is indicative of a color substantially at the location on the 3D image;

identifying a confidence level associated with the identified color of the location on the 3D image, wherein the confidence level is indicative of a likelihood that the identified color associated with the received data includes the color at the location on the 3D image of the object; and associating the identified color of the location on the 3D image with the location on the 2D image based on the confidence level.

19. The non-transitory computer readable medium of claim 18, wherein the location on the 2D image of the object is equivalent to the location on the 3D image of the object.

20. The non-transitory computer readable medium of claim 18, wherein the instructions are further executable by the computing device to cause the computing device to perform functions comprising:

receiving data associated with a simulation of the first ray;

based on the received data, identifying a color associated with the first ray, wherein the identified color associated with the first ray includes a weighted average of a confidence level associated with the first ray and the identified color associated with the first ray.

\* \* \* \* \*